(12) United States Patent
Webb et al.

(10) Patent No.: US 8,961,036 B2
(45) Date of Patent: Feb. 24, 2015

(54) FERRULE ASSEMBLY

(71) Applicant: Tyco Electronics Corporation, Berwyn, PA (US)

(72) Inventors: Joshua L. Webb, Stewartstown, PA (US); Douglas Harold Rohde, Hershey, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 13/951,037

(22) Filed: Jul. 25, 2013

(65) Prior Publication Data

US 2015/0030291 A1    Jan. 29, 2015

Related U.S. Application Data

(62) Division of application No. 12/847,423, filed on Jul. 30, 2010, now Pat. No. 8,573,856.

(51) Int. Cl.
*G02B 6/36* (2006.01)

(52) U.S. Cl.
USPC ............... 385/78; 385/53; 385/76; 385/77; 385/80

(58) Field of Classification Search
USPC ................. 385/53, 76, 77, 78, 80
See application file for complete search history.

(56) References Cited

U.S. PATENT DOCUMENTS

| 6,200,040 | B1 | 3/2001 | Edwards et al. |
| 6,246,026 | B1 | 6/2001 | Vergeest |
| 6,522,813 | B2 | 2/2003 | Rephaeli |
| 6,705,767 | B1 | 3/2004 | Dean, Jr. et al. |
| 6,963,687 | B2 | 11/2005 | Vergeest et al. |
| 7,194,179 | B1 | 3/2007 | Bryant et al. |
| 8,573,856 | B2 * | 11/2013 | Webb et al. .............. 385/78 |

FOREIGN PATENT DOCUMENTS

| JP | 09178975 A | 7/1997 |
| WO | 2004/017115 A1 | 2/2004 |

OTHER PUBLICATIONS

International Search Report, International Application No. PCT/US2011/001316, International Filing Date Jul. 26, 2011.

* cited by examiner

*Primary Examiner* — Jennifer Doan

(57) ABSTRACT

A method for preparing a ferrule assembly avoids polishing while providing adequate control over fiber end protrusion and co-planarity. A distal end of the fiber is prepared before securing the fiber in a ferrule, and before or after inserting the fiber into the ferrule. The prepared fiber is manipulated to provide a desired spatial relationship between the fiber end and the ferrule's end face, and then secured to maintain the desired spatial relationship. Preferably, the fiber end is prepared using a laser cleaving technique to provide a suitable end without abrasive polishing. An interferometer may be used to obtain measurements, during manipulation of the prepared fiber within the ferrule, that indicate whether the prepared fiber is satisfactorily positioned. In accordance with other aspects of the invention, a ferrule assembly prepared in accordance with the method, and a connector or other optical package including such a ferrule assembly are provided.

20 Claims, 5 Drawing Sheets

FERRULE ASSEMBLY

CROSS REFERENCE TO RELATED APPLICATIONS

This application is a divisional of and claims priority to U.S. patent application Ser. No. 12/847,423 filed Jul. 30, 2010, which is hereby incorporated by reference in its entirety.

FIELD OF INVENTION

The present invention relates generally to preparing a ferrule assembly including one or more optical fibers suitable for optical coupling, and, more particularly, to preparing a ferrule assembly without post-insertion polishing, while allowing for control of fiber end protrusion and fiber end co-planarity in the completed ferrule assembly.

BACKGROUND

Fiber optic communication systems include optical connectors that join segments of optical fibers. The principal function of an optical fiber connector is to hold a fiber end such that the core of the fiber is axially aligned with the optical path of the fiber component, etc. to which the connector is mated, e.g., so that light from the one fiber is optically coupled to another.

To mate fiber connectors, the end portion of each optical fiber must be mated with the end portion of a corresponding optical fiber. To minimize Fresnel loss, physical contact should be made between the fiber ends. Typically optical connectors include a "ferrule," which is a well-known component for holding one or more fibers such that the fiber ends are presented for optical coupling, to promote such physical contact.

To effect such physical contact, a ferrule assembly must be prepared. A ferrule assembly preparation technique involves stripping the fiber's buffer using a stripping tool, advancing the exposed portion of the fiber through a ferrule until the distal end of the fiber extends well beyond an end face of the ferrule, securing the fiber within the ferrule, e.g., by heat curing a suitable epoxy, and mechanically cleaving the distal end of the fiber. The preparation technique further includes polishing the distal end of the fiber and the ferrule to create a desired end face geometry (e.g., a substantially planar surface substantially perpendicular to the axis of the fiber) and/or to provide the desired degree of protrusion of each fiber relative to the distal end of its ferrule and/or to provide the desired degree of co-planarity of an array of fiber ends in a multi-fiber connector. Such cleaving is often performed using a mechanical hand tool, and such polishing is often performed using manual abrasive polishing steps using abrasive paper fixed on a polishing pad, typically using a gang polishing machine. It is a time-consuming and skill-intensive process to cleave and polish the optical fiber, and polishing must be performed to exacting standards.

No matter the techniques and tools used, cleaving and polishing the fiber end(s)/ferrules often results in a connector that will be unable to form an acceptable optical interconnection, due to improper cleaving, improper polishing technique and/or under- or over-polishing that causes variation from the desired protrusion and/or co-planarity specifications. Because polishing is typically performed after securing the fiber in the ferrule assembly, the defective assembly must be discarded. This conventional termination process is characterized by a significant amount of defective assemblies and fiber/ferrule/connector waste, and thus a low yield of satisfactory assemblies.

Therefore, Applicants have identified a need for a method that avoids polishing of the ferrule and reduces waste while providing adequate control over fiber protrusion and/or fiber co-planarity. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a method for preparing a ferrule assembly for optical coupling that avoids polishing of the ferrule and reduces waste while providing adequate control over fiber end protrusion and/or fiber end co-planarity in the completed ferrule assembly. Unlike prior art methods, the inventive method involves precisely positioning a prepared distal end of the fiber prior to securing the fiber in the ferrule. In one embodiment, the distal end of the fiber is prepared to include a desired end face geometry prior to insertion of the fiber into a ferrule. The method further involves positioning the prepared fiber relative to the ferrule in a precise manner, and then securing the fiber within the ferrule only after the desired fiber position is obtained. Because no post-insertion or post-securing polishing is required, the desired fiber position is retained in the completed ferrule assembly. In another embodiment, the distal end of the fiber is prepared after insertion into the ferrule, and a measuring system such as an interferometer or a machine vision system is used to precisely position the prepared end before securing the fiber in the ferrule.

More specifically, the present invention provides a method for preparing a ferrule assembly comprising: providing a ferrule body including a pathway for an optical fiber, the pathway having an end face; preparing a distal end of an optical fiber to provide a prepared fiber end having a desired end face geometry; positioning the optical fiber in the pathway; manipulating the optical fiber within the pathway to provide a desired spatial relationship between the fiber end and the pathway end face; and securing the optical fiber within the pathway to maintain the desired spatial relationship. Preferably, the fiber end is prepared using a laser cleaving technique to provide a suitably prepared end without the need for subsequent abrasive polishing. In one embodiment, the fiber is prepared/cleaved prior to insertion into the ferrule. In another embodiment, the fiber is prepared/cleaved after insertion into the ferrule. In both embodiments, an interferometer or machine vision system may be used to obtain measurements during manipulation of the prepared fiber within the ferrule. The measurements indicate whether the prepared fiber end is satisfactorily positioned relative to the ferrule end face and/or other fibers.

In accordance with other aspects of the invention, a ferrule assembly prepared in accordance with the method, and a connector or other optical package including such a ferrule assembly are provided also.

BRIEF SUMMARY OF DRAWINGS

The present invention will now be described by way of example with reference to the following drawings in which.

DETAILED DESCRIPTION

Figure 1:
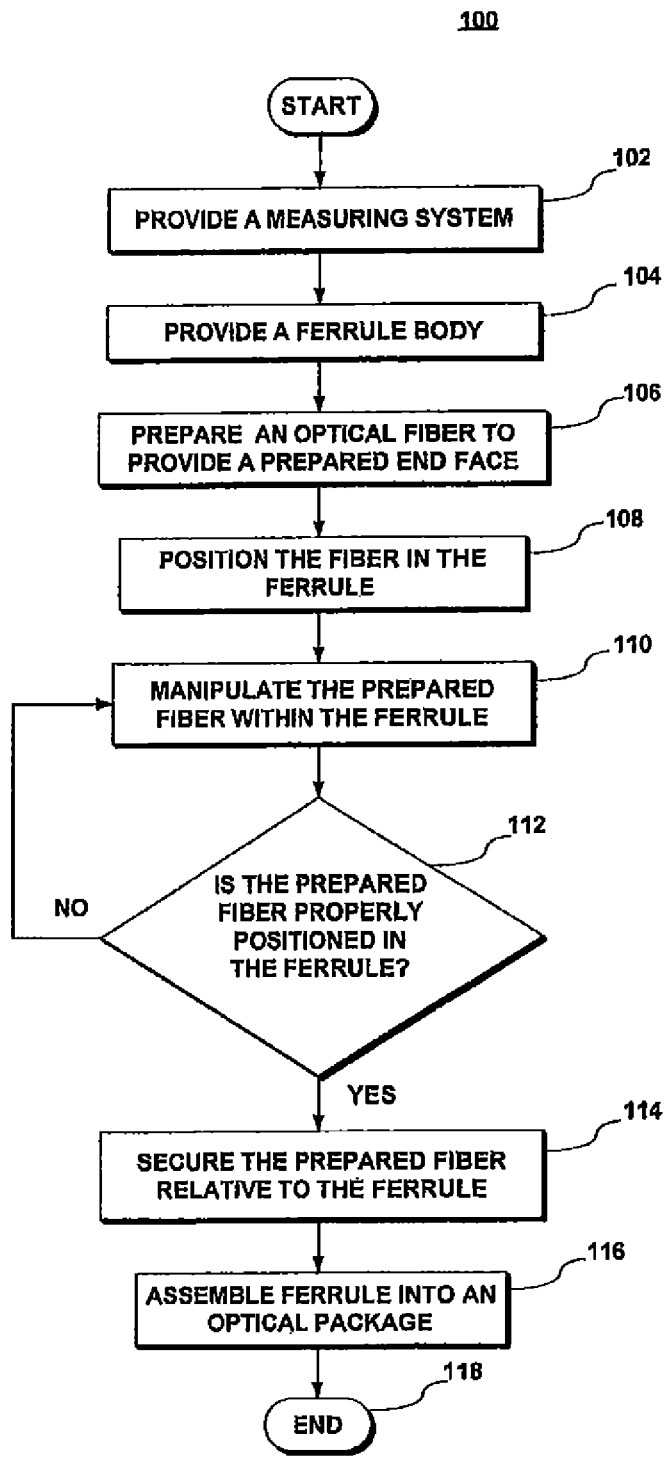
FIG. 1 is a flow chart of an exemplary method for preparing a ferrule assembly in accordance with the present invention.

FIG. 1 shows a flow chart 100 depicting an overview of a preferred method for preparing a ferrule assembly in accordance with the present invention. As used herein, the term "ferrule assembly" refers to a ferrule having one or more fibers terminated in it. The method begins with providing a measuring system capable of measuring distances in the range of approximately −10 to 10 micrometers (e.g., 10 micrometers proximally and distally of a reference point such as the ferrule end face), and providing a suitable ferrule body, as shown at steps 102 and 104. The measuring system may include a conventional non-contact interferometer or a conventional machine vision system, as discussed in greater detail below. The ferrule body has one or more pathways to receive fibers therein. Any desired conventional ferrule body may be used for this purpose, as discussed in greater detail below.

In the next step 106, one or more fibers are prepared for physical contact optical coupling. More specifically, the distal end of each fiber is prepared to produce an end face suitable for optical coupling without the need for further preparation of the fiber end. As used herein, a fiber end face that is suitable for optical coupling is one that has no optical or mechanical defects (e.g., no change in refractive index, no scratches or chips, etc.). Importantly, each fiber is prepared for physical contact optical coupling before securing the fiber in the ferrule. The fiber may be prepared either before insertion in the ferrule, or after insertion in the ferrule.

Figure 2:
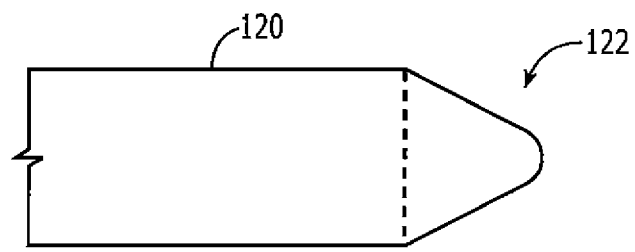
FIG. 2 is a diagrammatic view of an exemplary end face geometry formable by laser cleaving.

The distal ends of the fibers can be prepared using any traditional technique, although laser cleaving is preferred because it avoids the need for an additional polishing step. A preferred process for laser cleaving is described in U.S. Pat. Nos. 6,246,026 and 6,963,687, the disclosures of both of which are hereby incorporated herein by reference. Alternatively, each fiber end could be mechanically cleaved. Preferably, a precision mechanical cleaving technique and/or tool is used to avoid the necessity of polishing. Mechanical cleaving is a well-known technique that involves essentially shearing the fibers cleanly to provide a mating face. Methods of performing this polishing are well-known and may include, for example, physical grinding/polishing and "laser polishing" in which a laser is used to melt and thereby smooth the end face of the fiber. Such preparation of the optical fiber provides a prepared fiber end having a desired end face geometry that is suitable, without further polishing or preparation, for optical coupling. FIG. 2 shows diagrammatically an exemplary fiber 120 having a suitable prepared fiber end 122 provided by an exemplary laser cleaving process.

Figure 3:
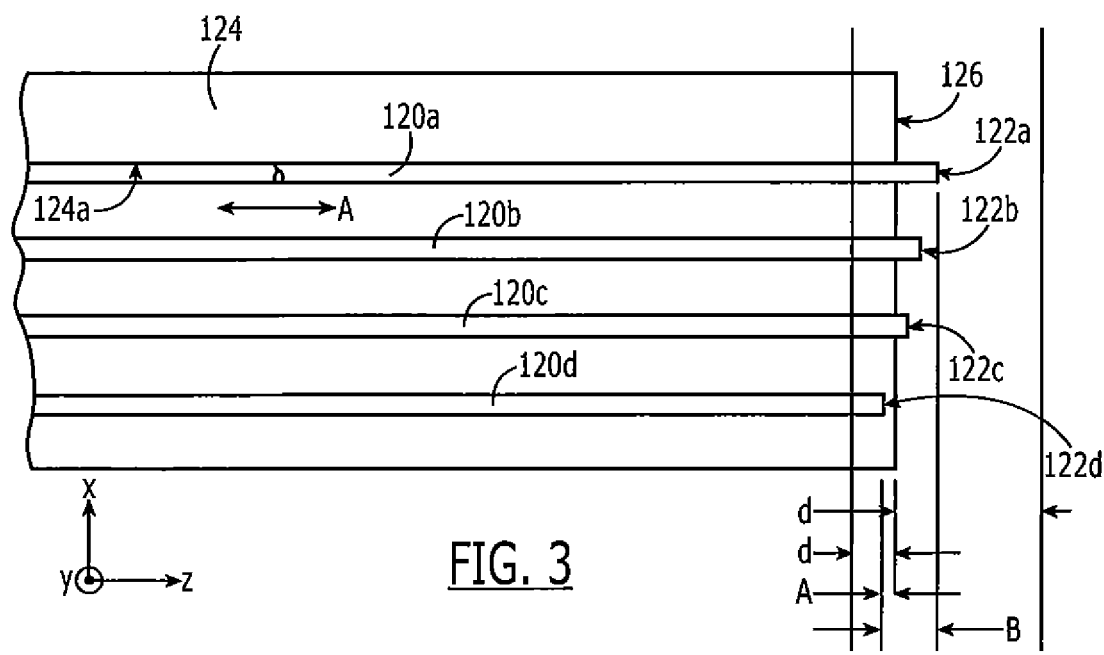
FIG. 3 is a diagrammatic view of an exemplary multi-fiber ferrule assembly.

As shown at step 108 of FIG. 1, the prepared fiber 120a is positioned within a respective pathway 124a of a ferrule body 124, as best shown in FIG. 3. In a ferrule body including multiple pathways, each fiber end may be prepared and inserted in a respective pathway successively, for all pathways. Alternatively, all fibers ends may be prepared, e.g., as part of a ribbon, before insertion of the first prepared fiber into one of the pathways. In certain embodiments, the fiber is prepared/cleaved before insertion in the ferrule. In other embodiments, the fiber is prepared/cleaved after insertion in the ferrule.

Next, the method proceeds to step 110, in which each prepared fiber, e.g., 120a, FIG. 3, is manipulated (e.g., axially reciprocated along the z-axis of FIG. 3 (in the A direction)) within a respective pathway 124a to provide a desired spatial relationship between the prepared fiber end 122a and the pathway end face 126. By way of example, the desired spatial relationship may relate to fiber end protrusion, i.e., the distance by which the prepared fiber end extends distally beyond the pathway end face (see A, FIG. 3) (or is positioned proximally behind the pathway end face (see A' between end 122d and end face 126 for fiber 120d, FIG. 3)). By way of example, a distance d falling in the range of −0.1 μm (i.e., 0.1 micrometers behind/proximally of the pathway end face 126) to +0.1 μm (i.e., 0.1 micrometers beyond/distally of the pathway end face 126) is suitable for optical applications for single-fiber ferrules. For multi-fiber ferrules, a desired range for the distance d is greater than 1.0 μm (i.e., 1.0 micrometers beyond/distally of the pathway end face 126). Additionally, the desired spatial relationship may relate to fiber co-planarity, i.e., the spatial relationship among the prepared fiber ends of multiple fibers in a multi-fiber ferrule (see B, FIG. 3). By way of example, prepared fiber ends of a multi-fiber ferrule falling within a span B of 0.5 micrometers provides sufficient co-planarity for many optical applications.

Figure 4:
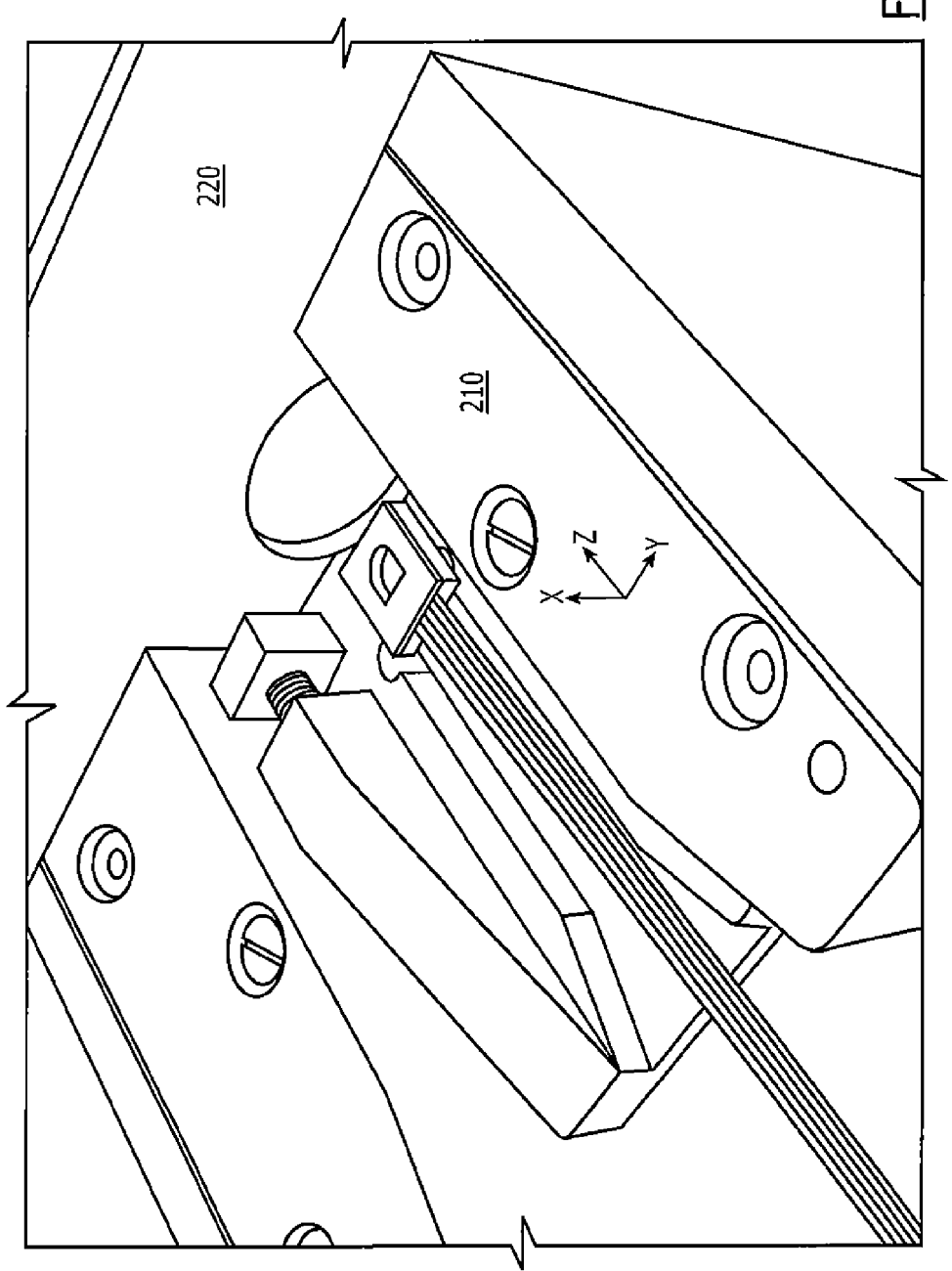
FIG. 4 is a perspective view of an exemplary ferrule secured to a table of an exemplary measuring system.

Each fiber may be manually manipulated to adjust the position of the prepared fiber end, e.g., 122a, relative to a pathway end face 126 and/or relative to other fiber ends, e.g., 122b, 122c, 122d. In a preferred embodiment, providing the ferrule body 124 in step 104 includes securing the ferrule body 124 to a stage portion of the measuring system provided in step 102, such that the ferrule body is operatively positioned for the taking of measurements that relate the axial position of the prepared fiber end to the axial position of the respective pathway end face (along the z-axis shown). Alternatively, step 112 includes the step of securing the ferrule to the measuring system. FIG. 4 shows an exemplary MT-style ferrule body 124 in operative position onto a stage 210 of a commercially available non-contact interferometer 220 manufactured and/or distributed by Direct Optical Research Company of Largo, Fla., USA. Any suitable non-contact interferometer configured for measuring distances in the range of about −10 to 10 micrometers (e.g., 10 micrometers proximally and distally of a reference point such as the ferrule end face) may be used for this purpose, and various interferometers are commercially available for this purpose, as will be understood by those of ordinary skill in the art. Techniques for using interferometers to obtain such measurements are well-known in the art and are beyond the scope of the present invention, and thus are not described in detail herein.

Alternatively, a conventional machine vision system such as a camera-based system manufactured and/or sold by PPT Vision, Inc. of Bloomington, Minn., may be used in a conventional manner to obtain such measurements, as will be understood by those of ordinary skill in the art. As well-known in the art, such machine vision systems are often used to inspect, detect presence of components, position components. Techniques for using machine vision systems to obtain such measurements are well-known in the art and are beyond the scope of the present invention, and thus are not described in detail herein.

Each fiber, e.g., 120*a*, is manipulated by adjusting its axial position within a respective pathway, e.g., 124*a*, until it is satisfactorily positioned, to provide the desired spatial relationship between the prepared fiber end and the pathway end face (A/A') (to provide adequate fiber protrusion), and/of relative to among a plurality of prepared fiber ends (B) (to provide adequate co-planarity). Such satisfactory positioning may be achieved, for example, by positioning and re-positioning the fiber 120*a* along the z-axis (in direction A) (FIG. 3) while taking repeated measurements with the interferometer 220 or other measuring system, until a measurement (A/A') within a desired measurement range has been obtained, as provided/displayed by the measuring system. Such manipulation to properly position the optical fiber is shown at steps 110 and 112 of FIG. 1. It should be noted that the measuring system may measure fiber end distances relative to the ferrule pathway end face, and the co-planarity measurement may be calculated or inferred from such measurements. Alternatively, the measuring system, etc. may measure axial (z-direction) distances among the fiber ends 120*a*, 120*b*, etc.

After satisfactory positioning of the fiber(s) within the ferrule body has been obtained, the fiber(s) is/are secured within the pathways/ferrule body, as shown at step 114 of FIG. 1. Such securing of the fibers relative to the ferrule forms the ferrule assembly (see 300, FIG. 5). The fibers may be secured in a conventional manner, as discussed in greater detail below.

Figure 6:
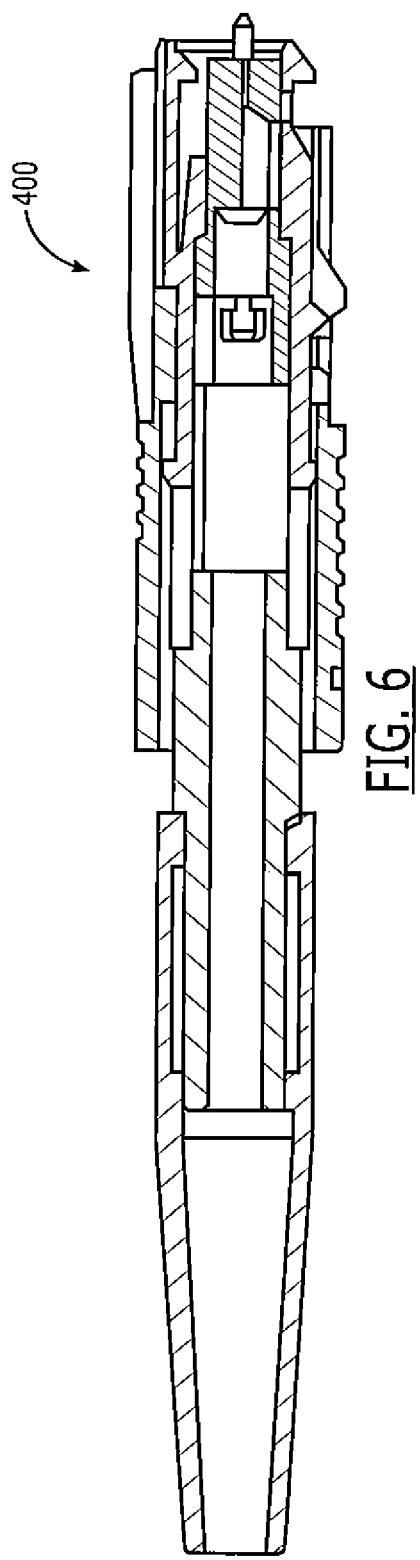
FIG. 6 is a cross-sectional view of an exemplary optical package including the ferrule assembly of claim 5.

The exemplary method ends after the ferrule assembly 300 has been incorporated into an optical package 400, such as a connector or other ferrule-containing device, as shown at steps 116 and 118. An exemplary optically package 400 in the form of a connector, is shown in FIG. 6. Exemplary optical packages are discussed below.

Step 104, discussed above, involves providing at least one ferrule body 124. The ferrule body comprises one or more pathways 124*a*, 124*b*, etc., each of which is adapted to receive a fiber and has an end face 126 which, in the final ferrule assembly 300, presents each fiber end for mating and optical coupling to an optical pathway of a mating fiber or component. The pathways may be, for example, bore holes or V-grooves. Such ferrules are well-known in the art and include for example, MT-style ferrules (such as those used in the MT-RJ and Lightray MPX7 ferrules), SC-style ferrules, and LC- and MU-style ferrules. Any conventional ferrule body may be used.

As mentioned above, a conventional pathway end face is typically polished to remove all anomalies therefrom and to present the fiber ends for coupling. However, the ferrule of the present invention does not require such polishing since the fiber ends are effectively polished during the preparation step 106, either before or after insertion of the fibers into the ferrule in step 108. Therefore, in a preferred embodiment, the pathway end face 126 is unpolished. As such, it typically has surface anomalies that would tend to interfere with the end face of a mating connector and prevent end faces of fibers from making physical contact with mating fibers. For example, ridges or bumps on the mating face of an unpolished ferrule can prevent the mating face from making good physical contact with a perfectly planar surface. Polishing the ferrule is also often performed to cause the fiber end faces to protrude a certain distance from the ferrule's mating face. Such a protrusion increases the likelihood of the fiber end faces making physical contact with the mating optical pathway of a mating structure. In the context of the present invention, fiber protrusion can be controlled, by precisely positioning the fiber before securing it in the ferrule body, to ensure that any existing surface anomalies do not interfere with physical contact of the fibers by precisely positioning the prepared fiber relative to the pathway end face, using the interferometer or other measuring system.

Step 106, discussed above, involves cleaving the fiber. In a laser cleaving process, a laser with a wavelength between 0.1 and 1.5 μm or between 8.5 μm to 10 μm can be used for producing the beam for cleaving the fibers. Suitable lasers include, for example, $CO_2$ and excimer lasers, although a $CO_2$ laser is preferred. $CO_2$ lasers may be advantageous due to the high speed at which they can be operated and resulting cost effectiveness.

The laser cleaving process has a number of advantages over traditional mechanical cleaving approaches. Laser cleaving does not affect the ferrule end face like abrasive polishing does. Perhaps the most significant advantage is that laser cleaving produces a very smooth fiber end face so additional machining of the fiber end after cutting—as is normal with mechanical cutting processes—is no longer necessary. Elimination of polishing is very significant. Not only is polishing a difficult and time-consuming task, which is prone to error (and therefore waste), but it also affects the axial position of the fiber end face. That is, polishing grinds or otherwise alters the physical features of the end face and thereby affects the axial position of the fiber end. This effect can be critical in the case of a multi-fiber array (e.g., ribbon cable) in which variation in axial position of the various fibers cannot be tolerated. More specifically, if the end faces are at different axial positions, they are prevented from simultaneously making physical contact with optical paths of the mating component. Because a laser-cleaved fiber does not need to be polished, the axial position of its end face is not subject to this variation.

Figure 5:
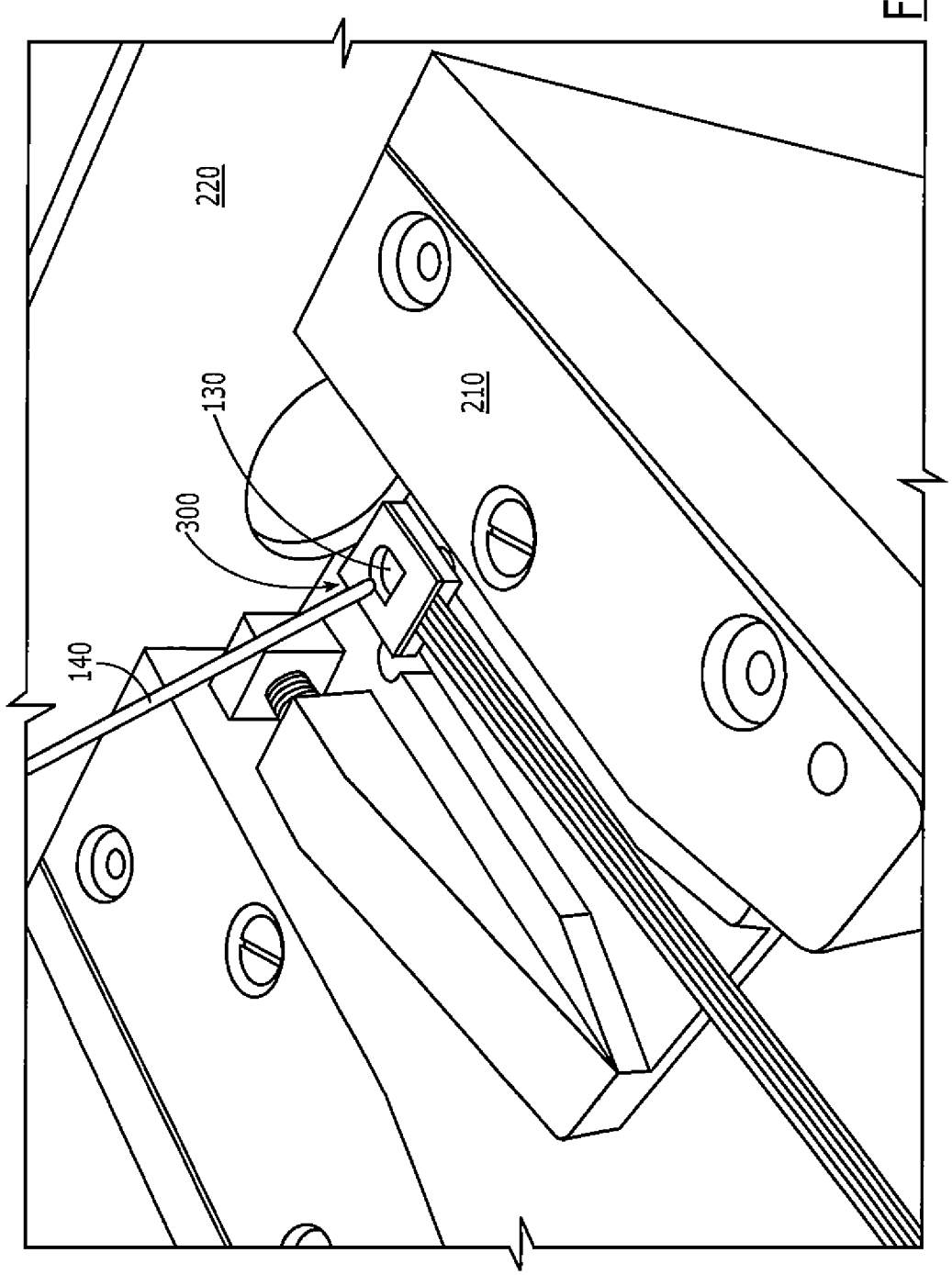
FIG. 5 is a perspective view of the ferrule and measuring system of FIG. 4, showing application of epoxy to secure the fibers within the ferrule to form a ferrule assembly.

In step 114 discussed above, the fibers are secured within the ferrule such that their relative positions with respect to the ferrule end face are fixed. Methods of securing the fibers relative to the ferrules are well-known and include, for example, applying epoxy to the pathways. FIG. 5 shows application of epoxy to the ferrule body 124 via a port 130 using a manual syringe or automatic dispensing system 140, as part of the securing step. By way of example, certain epoxies, such as Optocast 3505-LV-UTF are rapidly curable by exposure to UV light, which may be performed while the ferrule body 124 and fibers remain in position on the measuring device, as shown in FIG. 5. Other techniques for fixing the fibers in position may include, for example, clamping the fiber in an object which is in fixed relation to the ferrule (see, for example, U.S. Pat. No. 6,200,040 which discloses such an exemplary clamping mechanism). Any conventional securing method may be used.

The ferrule assembly 300 of the present invention is uniquely suited to facilitate fiber protrusion since the fiber end and ferrule mating face are not polished simultaneously as in the prior art. Further, each fiber is secured within the ferrule after its ends are prepared and after the fiber is precisely positioned, thus providing a high degree of control of the amount of fiber end protrusion, and the degree of fiber co-planarity among prepared fiber ends in a multi-fiber ferrule/connector. Further, because the fiber is not secured in the ferrule until after the desired end configuration is provided, and because there is no need for polishing after the fiber is secured in the ferrule, there is little or no need for rework, and little or no waste.

In step 116 discussed above, the ferrule assembly 300 having prepared fibers secured therein is assembled into an optical package. As used herein, the term "optical package" refers broadly to an assembly comprising a fiber-terminated ferrule assembly and may include, for example, a ferrule-containing connector (e.g., multi-fiber connectors such as the Lightray MPX7 connector, MT-RJ connector, and MTP connector, and single-fiber connectors such as the SC-, FC-, LC-, and MU-type connectors), or a ferrule-containing device (e.g., passive devices, such as, add/drop filters, arrayed wave guide gratings (AWGs), splitters/couplers, and attenuators, and active devices, such as, optical amplifiers, transmitters, receivers and transceivers). As is well known, the ferrule assembly in the optical package holds a fiber end such that the core of the fiber is axially aligned with the optical path of the mating component to which the connector or device is mated. This way, light from the fiber is optically coupled to the other component. The term "optical pathway" as used herein refers to any medium for conducting optical signals, and includes, for example, a fiber or waveguide, a silica or polymeric structure in a substrate, or a silica or polymeric optical component. The term "mating component" refers to an optical package that contains or comprises the optical pathway, and may include, for example, optical connectors and optical devices as mentioned above. A mating component typically comprises a mating surface which is adapted to receive the mating face of the ferrule to optically couple the fiber(s) with the mating optical pathway(s). Such mating surfaces are well known in the art.

Optical packages comprising the ferrule assembly of the present invention have a number of advantages over traditional ferrule-containing packages. First, as mentioned above, the ferrule assembly of the present invention obviates the need for post-securing polishing. This results in significant simplification of the assembly process and a significant reduction in costs.

An additional advantage is derived from the configurability of the each fiber's protrusion from its respective pathway end face. The protrusion not only allows for the use of an unpolished ferrule but also allows for configuration of co-planarity in multifiber ferrules and thus facilitates mating with another ferrule, including another unpolished ferrule. Thus, the ferrule assembly of the present invention does away with the need for polished ferrules entirely, thereby reducing costs among various optical packages.

While the present invention has been particularly shown and described with reference to the preferred mode as illustrated in the drawing, it will be understood by one skilled in the art that various changes in detail may be effected therein without departing from the spirit and scope of the invention as defined by the claims.

What is claimed is:

1. A ferrule assembly for optically coupling an optical fiber having a desired end face geometry, the ferrule assembly having been prepared by a method comprising:
   providing a ferrule body including a pathway for an optical fiber, the ferrule body having an end face;
   preparing a distal end of an optical fiber to provide a prepared fiber end having the desired end face geometry;
   positioning the prepared optical fiber in the pathway;
   manipulating the prepared optical fiber within the pathway to provide a desired spatial relationship between the fiber's distal end and the end face; and
   securing the prepared optical fiber within the pathway to maintain the desired spatial relationship.

2. An optical package comprising the ferrule assembly of claim 1.

3. A ferrule assembly prepared by a method comprising:
   providing a ferrule body including a pathway for an optical fiber, the ferrule body having an end face;
   providing a measuring system having a stage defining an operative position for holding the ferrule body in position for taking of measurements relative to the ferrule body;
   securing the ferrule body in the operative position on the stage of the measuring system;
   positioning the optical fiber in the ferrule body;
   after positioning the optical fiber in the ferrule body, cleaving a distal end of the optical fiber to provide a cleaved fiber end having a desired end face geometry;
   operating the measuring system to measure a distance between the cleaved fiber end and the end face;
   manipulating the cleaved optical fiber within the pathway until the measured distance is within a desired distance range; and
   curing epoxy to secure the cleaved optical fiber within the ferrule body.

4. An optical package comprising the ferrule assembly of claim 3.

5. The ferrule assembly of claim 3, wherein the optical fiber is positioned in the ferrule body before securing the ferrule body in the operative position on the stage of the measuring system.

6. The ferrule assembly of claim 3, wherein the desired distance range is greater than −0.1 micrometers relative to the end face.

7. The ferrule assembly of claim 3, wherein the measuring system comprises an interferometer.

8. The ferrule assembly of claim 3, wherein the measuring system comprises a machine vision system.

9. The ferrule assembly of claim 1, wherein manipulating the prepared optical fiber within the pathway to provide the desired spatial relationship comprises:
   repeatedly measuring a distance between the prepared fiber end and the end face; and
   manipulating the optical fiber within the pathway until the measured distance is within a desired distance range.

10. The ferrule assembly of claim 9, wherein the desired distance range is greater than −0.1 micrometers relative to the end face.

11. The ferrule assembly of claim 10, wherein measuring the distance comprises operating an interferometer to obtain the measured distance.

12. The ferrule assembly of claim 10, wherein measuring the distance comprises operating a machine vision system to obtain the measured distance.

13. The ferrule assembly of claim 1, wherein preparing the distal end of the optical fiber comprises:
   cleaving the optical fiber to provide a cleaved fiber end.

14. The ferrule assembly of claim 6, wherein the cleaving is performed by laser cleaving.

15. The ferrule assembly of claim 1, wherein securing the optical fiber within the pathway comprises:
   applying epoxy within the pathway; and
   curing the epoxy.

16. The ferrule assembly of claim 1, wherein the ferrule body comprises a plurality of pathways and the method further comprises:
   preparing each distal end of a plurality of optical fibers to provide respective prepared fiber ends having desired end face geometries;
   positioning each prepared optical fiber in a respective pathway;
   manipulating each prepared optical fiber within each respective pathway to provide a respective desired spatial relationship between each fiber end and the end face; and securing the prepared optical fibers within the pathways to maintain the desired spatial relationships.

17. The ferrule assembly of claim 10, wherein the ferrule body comprises a plurality of pathways and the method further comprises:

positioning each of a plurality of optical fibers in a respective pathway;

cleaving a distal end of each of the plurality of optical fibers to provide respective prepared fiber ends having desired end face geometries;

operating the measuring system to measure a respective distance between each cleaved fiber end and the end face;

manipulating each cleaved optical fiber within each respective pathway until each respective measured distance is within a desired distance range; and curing epoxy to secure the plurality of optical fibers within the pathways.

18. The ferrule assembly of claim 10, wherein the ferrule body comprises a plurality of pathways, and the method further comprises:

positioning each of a plurality of optical fibers in a respective pathway;

cleaving a distal end of each of the plurality of optical fibers to provide respective prepared fiber ends having desired end face geometries;

operating the measuring system to measure a respective distance between each cleaved fiber end and the end face;

manipulating each cleaved optical fiber within each respective pathway until each respective measured distance is within a desired distance range;

manipulating each cleaved optical fiber within each respective pathway to provide a desired co-planarity relationship between the respective fiber ends; and curing epoxy to secure the plurality of optical fibers within the pathways.

19. The ferrule assembly of claim 16, wherein the desired distance range is greater than 1.0 micrometers distally of the end face.

20. The ferrule assembly of claim 17, wherein the desired co-planarity relationship between the respective fiber end faces is a measured fiber end face variation among the plurality of optical fibers of no more than approximately 0.5 micrometers.

* * * * *